United States Patent [19]
Robbins

[11] 3,867,541
[45] Feb. 18, 1975

[54] COMPOSITIONS AND METHODS FOR DISAGGREGATING BLOOD CELLS

[76] Inventor: Ralph C. Robbins, 1410 N.W. 28th St., Gainesville, Fla. 32601

[22] Filed: May 3, 1972

[21] Appl. No.: 250,035

[52] U.S. Cl............ 424/283, 260/345.2, 260/345.5, 424/183
[51] Int. Cl......................... A01n 9/28, A61k 17/18
[58] Field of Search............................. 424/183, 283

[56]  References Cited
OTHER PUBLICATIONS
Robbins; J. Atherosclerosis Research, Vol. 7, pp. 3–10 (1967) "Effect of Flavonoids on Survival Time of Rats Fed Thrombogenic or Atherogenic Regimens."
Robbins; Food Science Mimeo Reports FS68-1, Lake Alfred, Fla. -475- 10/12/67, RCR, "Effect of Flavonoids on Experimentally Induced Atherosclerosis and Thrombosis."

*Primary Examiner*—Shep K. Rose
*Attorney, Agent, or Firm*—George H. Baldwin; Arthur G. Yeager

[57]  ABSTRACT

Methoxylated flavonoids having at least two methoxyl radicals or substituents exhibit powerful anti-adhesive effects on blood cells in vivo and in vitro. When such flavonoids are combined with an anticoagulant, greater protection against thrombi formation is provided than when either is used without the other.

6 Claims, No Drawings

COMPOSITIONS AND METHODS FOR DISAGGREGATING BLOOD CELLS

BACKGROUND OF THE INVENTION

1. Field of the Invention

This invention relates to anti-adhesive compositions, alone or in combination with anticoagulant compositions, and methods for disaggregating blood cells.

2. Description of the Prior Art

Aggregation or clumping of blood cells or the formed elements of blood as a concomitant to illness and injury has been of concern in medicine from time of antiquity (Fahraeus, *The Suspension-stability of the Blood* Acta. Med. Scandinav. Vol. 55, 1–228, 1921). Clumping of blood cells is the phenomenon underlying the buffy coat of blood which led to the practice of phlebotomy by the ancient physicians (Fahraeus above). In modern times concern with aggregated blood cells has led to the development of the erythrocyte sedimentation rate (ESR) as a measurement of the phenomenon (Wintrobe and Landsberg, *A Standardized Technique for the Blood Sedimentation Test*, American Journal of Medical Science, Vol. 189;pp. 102 – 115, 1935) and the concept of sludged blood in pathologic physiology (Knisely et al,Sludged *Blood*, Science, Vol. 106, pp. 431 – 440, 1947).

While clumped blood cells long have been observed to interfere with the microcirculation, the physiologic and pathologic effects of aggregation have been obscure until recent years. Reports have appeared in the last two decades that blood cell aggregation interferes with oxygen uptake, carbon dioxide elimination, healing of wounds, and promotes destruction of erythrocytes (anemia of injury), infarction of vital organs, thrombosis and embolism of large blood vessels (Gelin, *Rheologic Disturbances and the Use of Low Viscosity Dextran in Surgery*, Reveiw of Surgery Vol. 19, 385–400, 1962).

Despite the long time concern with clumping and adhesion of blood cells and more recent evidence of their significance in pathology, relatively few drugs are available for clinical use against aggregation. Low molecular weight Dextran appears to be the most widely used compound clinically and there are many reports on its use and beneficial effects (Gelin above). The chief disadvantage of Dextran is the high dosages required (1 g/kg of body wt.) and it must be infused intravascularly. Recently (Bicher, *Prevention of Sludge-Induced Myocardial Damage by an Anti-Adhesive Drug*, Bibl. Anat. No. 10, 202 – 207, 1960) it has been reported that 2 methyl 2 tert-butyl δ ketolactone or 2-4 Methyl Butyl Ketolactone had blood cell anti-adhesive effects and that it prevented myocardial damage due to severe blood cell aggregation. Such ketolactone is described as an important prototype of anti-adhesive drugs which are not too toxic for in vivo use and the drug is administered intra-vascularly and in dosages of 200 mg/kg body weight (Bicher above).

Applicant has been involved in research and testing of flavonoids for a number of years and has published a number of papers thereon, namely:

1. R. C. Robbins, *Effect of Vitamin C and flavonoids on blood cell aggregation and capillary resistance*, International Journal for Vitamin Research, Vol. 36, No. 1, pp. 10–15, 1966;

2. R. C. Robbins, *Effect of Flavonoids on Survival Time of Rats Fed Thrombogenic or Atherogenic Regimens*, Journal of Atherosclerosis Research, Vol. 7, pp. 3–10, 1967;

3. R. C. Robbins, *Effect of Flavonoids on Experimentally Induced Atherosclerosis And Thrombosis*, Food Science Mimeo Report FS 68 -1, Lake Alfred, Florida — 475 — 10/12/67 — RCR.

4. R. C. Robbins et al., *The In Vitro Sensitivity of Erythrocyte Aggregation to Quinine: Assessment by a Serial Blood Sedimentation Procedure*, Clinical Chemistry, Vol.17, No. 1 pp. 31–33, 1971.

5. R. C. Robbins, *Effects of Phenyl Benzo -γ- Pyrone Derivatives (Flavonoids) on Blood Cell Aggregation: Basis for a Concept of Mode of Action*, Clinical Chemistry Vol. 17, No. 5, pp. 433–437, 1971;

6. R. C. Robbins, et al., *Methoxylated Phenyl Benzo -γ-Pyrone Derivatives (Flavonoids) That Highly Inhibit Erythrocyte Aggregation*, Clinical Chemistry Vol. 17, No. 11, p. 1,109–1,113, 1971.

While some of the prior art references above make certain broad suggestions that flavonoids may be of some use as a composition for disaggregating blood cells, the problems of or the solutions therefor to effectively disaggregate blood cells and anticoagulate blood by the use of a flavonoid, without or with an anticoagulant, having at least two methoxyl radicals or substituents has not been disclosed or suggested by the prior art references either alone or in any obvious combinations thereof, nor do such references disclose or teach the invention claimed herein.

SUMMARY OF THE INVENTION

The invention is directed specifically to a composition for disaggregating blood cells and comprises a flavonoid having at least two methoxy substituents and the method of introducing same into the bloodstream as by intra-vascular infusion or by oral ingestion or otherwise as known in the art. Furthermore, when an anticoagulant is added to such anti-adhesive flavonoid, the total effect and protection offered by the combination were enhanced against thrombi formation problems.

A general object of this invention is to provide improved anti-adhesive compositions and method of introducing same into the bloodstream.

Another general object is the provision of anti-adhesive and anticoagulant compositions and methods of infusion into the bloodstream.

A particular object is to provide effective and strong blood cell anti-adhesive compositions having low toxicity.

Another particular object is the provision of compositions for disaggregating blood cells which may be administered in relatively small quantities and/or in any manner which results in the introduction into the bloodstream, as by oral ingestion or intra-vascular infusion or otherwise.

A specific object is to provide improved compositions for declumping blood cells which are found to be in foods, such as the citrus peel and even in the citrus juices that are consumed.

Other specific objects include the ready availability of the methoxylated flavonoids in accord with this invention and the general utility of such flavonoids in the medical field.

The novel features which are believed to be characteristic of this invention are set forth with particularity in the appended claims. The invention itself, however, both as to its organization and method of operation, together with further objects and advantages thereof, may best be understood by reference to the following description.

DESCRIPTION OF THE PREFERRED EMBODIMENTS OF THE INVENTION

This invention relates to the discovery that methoxylated flavonoids having at least two methoxyl substituents have strong blood cell anti-adhesive effects [ 5) Robbins and 6) Robbins et al. above]. Several of the methoxylated flavonoids have blood cell anti-adhesive activity but they vary in degree [ 6) Robbins et al. above]. Since flavonoids exhibit blood cell anti-adhesive effects both in vivo (in the body) and in in vitro (test tubes), these compounds appear to exert their effects on the blood cells by some type of membrane action. The usefulness of these anti-adhesive properties of the methoxylated flavonoids in drug therapy is strongly indicated, as hereinafter more full set forth.

The highly methoxylated flavonoid Nobiletin was administered at 2.1 mg/kg to rats which showed at 85% survival rate when challenged with 80 mg/ADP/kg injected directly into the heart. In contract, rats given 200 mg/kg of 2 methyl 2 tert-butyl δ ketolactone and challenged with 170 mg adenosine diphosphate per kg in the caudal caval vein showed a 75 percent survival rate. Also, the highly methoxylated flavonoid Sinensetin when added at a level of 11.1 micrograms/ml to clumped blood from patients suffering from diabetes, lukemia, tuberculosis or pneumonia reduced the clumping and the erythrocyte sedimentation rate by an average of 31.5 percent.

The methoxylated flavonoids should be effective when orally ingested since the vitamin P flavonoids are readily absorbed from the gastrointestinal tract (Griffin et al, Rutin and Related Flavonoids, Mack Pub. Co. N.V. pp. 97 and 98, 1955). Also, the high activity of the methoxylated flavonoids indicate effectiveness at low dosages, thus relatively small quantities would need to be absorbed in order to disaggregate clumped blood. For a subject containing 6 liters of blood, 66.6 mg would give a blood concentration equal to that concentration shown to be effective in vitro in the diseases listed hereinabove.

As is well know, flavonoids are compounds or compositions or carbon-hydrogen-oxygen and the term includes numerous classes of flavonoid compounds (Geissman, *The Chemistry of Flavonoid Compounds*, The Macmillan Company, New York, 666 pages, 1962 and Harborne, *Comparative Biochemistry of the Flavonoids*, Academic Press, London, New York, 383 pages, 1967). The term flavonoid encompasses classes of compounds such as flavanones, 3-hydroxyflavanones, flavans, 3-hydroxyflavans, flavan-3, 4-diols, flavones, chalcones, aurones, flavonols, dihydro flavonols, isoflavones, isoflavanones, and derivaties of the above.

Alternation of some of the compounds to form the chalcone derivatives, wherein at least two methoxyl substituents are included, does not appear to appreciably influence blood cell disaggregating activity since members of each of the above classes and some of the chalcone derivatives have been observed to show blood cell anti-adhesive activity, as hereinafter more fully described.

The substitution of various carbohydrate substituents in some of the compounds would not appear to be a major factor in disaggregating activity, since both aglycones and glycosides have been observed to show such activity. For example, quercetin and its glycoside rutin did not show significant differences in blood cell anti-adhesive activity [5) Robbins, above].

Compositions containing hydrogen or hydroxyl substituents are various positions on the rings show some anti-adhesive activity, but in all such compositions tested there was only very slight bood cell anti-adhesive activity. As the methoxyl substituents are substituted on the rings for hydrogen or hydroxyl substituents, blood cell anti-adhesive activity generally increased. However, the position of the methoxyl substituents also appear to effect the activity of such compositions [ 6) Robbins et al., above].

The methoxylated flavonoid compositions that have been found to exhibit strong anti-adhesive effects on blood cells and were available in sufficient quantity for comparative testing in vivo and in vitro include [in decreasing order of activity]:

A. 3',4',5,6,7-pentamethoxyflavone (Sinensetin)
B. 3',4',5,6,7,8-hexamethoxyflavone (Nobiletin)
C. 3,3',4',5,6,7,8-heptamethoxyflavone(Heptamethoxyflavone)
D. 4',5,6,7,8-pentamethoxyflavone (Tangeretin)
E. 4',5,6,7-tetramethoxyflavone(Tetra-O-methylscutellarein)
F. 4',5,7-trimethoxyflavone (Tri-O-methylapigenin)

The above compositions were all significantly more active against blood cell aggregation than was low molecular weight Dextran. However, Tri-O-methylapigenin, Tetra-O-methylscutellarein and Tangeretin were significantly less active than Sinensetin, Nobiletin and Heptamethoxyflavone. Also, Seninsetin was significantly more active than any compound tested [ 6) Robbins et al. above].

Other methoxylated flavanoids or some of the chalcones have shown some effective anti-adhesive activity, but these have not been available in sufficient quantity for extensive testing and include:

G. 2' hydroxy 3,3',4,4' tetramethoxychalcone (active in concentrations of about $1 \times 10^{-7}$M)
H. 2' hydroxy 3,4,4' trimethoxyflavone (active in concentrations of about $1 \times 10^{116\ 5}$M)

A few flavonoid compounds (some Vitamin P flavonoids I–K) have known some very slight blood cell anti-adhesive activity;

I. 3',5-dihydroxy-4'-methoxyflavonone-7-rhamnoglucoside (Hesperidin)
J. 3,5,7,3',4'-pentahydroxyflavonol (Quercetin)
K. 5,7,3',4'-tetrahydroxyflavonol-3-rhamnoglucoside (Rutin)
L. 3-hydroxyflavone And other flavonoid compounds showed an increase in the erythrocyte aggregation;

M. 5,4'-hydroxyflavanone-7-neohesperidose (Naringin)

The above compositions A) – M) show three groups of flavonoids; i.e., the highly active methoxylated compositions hvaing at least two methoxy substituents, particularly A – F) [and G and H], the slightly active Vitamin P compositions I – K) and other flavonoid compositions particularly M) which increase blood cell aggregation. There appears to be some continuity of some anti-adhesive properties from the very slightly active vitamin P flavonoids to the highly active methoxylated flavonoids having at least two methoxyl substituents.

Further, the tests show that there may be some foundation for the contradictory thought and observations (*Freedman* et al., *Citrus Flavonoid Complex: Chemical Fractionation and Biological Activity*, Science Vol. 139, pp. 344 and 345, 1963) which have characterized the use of flavonoids in medicine. From the tests made several explanations may be advanced to explain certain inconsistencies in the prior art, namely that vitamin P flavonoids, the highly active methoxylated flavonoids, and flavonoids that increase aggregation, occur together in citrus and different citrus preparations may have contained differing proportions of the various flavonoids. Also, there is some evidence that some of the weakly active flavonoids may reverse their effect on membranes. [5) Robbins above].

The present tests and evidence of anti-adhesive effects on blood cells by flavonoids having at least two methoxyl substituents both in vivo and in vitro indicates an effect on membranes, and this evidence of an anti-adhesive effect on blood cells by flavonoids having at least two methoxyl substituents was essentially provided by a serial blood sedimentation procedure for measuring serial erythrocyte sedimentation rate (ESR) developed heretofore [ 4) Robbins et al. above], which confirmed in vitro the in vivo effects of quinine on blood cell aggregation. Using the above ESR procedure, it was found that some Vitamin P flavonoids showed a very slight and delayed anti-adhesive effect on blood cell aggregation, Naringin treated blood increased blood cell aggregation and the pentamethoxylated flavonoid Tangeretin showed strong blood cell anti-adhesive effects [ 5) Robbins above]. Subsequently, using the same procedure it was found that other flavonoids containing two or more methoxyl substituents showed blood cell disaggregating effects [ 6) Robbins et al. above].

Methoxylated flavonoids, having two or more methoxyl substituents, are found to be of utility in medicine as was further demonstrated when Nobiletin (3',4',5,6-,8-hexamethoxyflavone) showed a highly significant ($P<0.01$) effect against adenosine diphosphate induced thrombosis.

Tests were performed to determine whether the highly methoxylated flavonoids, ones having at least two methoxyl substituents and exhibit strong anti-adhesive effects, may show clinically that they are useful in antithrombogenic activity as well.

In accord with prior teachings, Adenosine Diphophate (ADP) injected intravenously into rats produced strong platelet aggregation, widespread lung thrombosis and death. Others have found both platelet and red cell thrombi in rats which had been infused with ADP and that death appeared to be the result of pulmonary thrombosis combined with reflectory respiratory arrest. Infusion of ADP was used to test the effectiveness of the anti-adhesive compound 2 - 4 Methyl Butyl Ketolactone against thrombosis caused by intravascular infusion of ADP. (Bicher et al., *Prevention by an Anti-Adhesive Drug of Thrombosis Caused by Blood Cell Aggregation*, Angiology, Vol. 21, pp. 413–441, 1970).

In view of this prior art, tests were conducted to determine whether the highly methoxylated flavonoid Nobiletin showed a protective effect against death due to intravascular infusion of ADP, and the activity of Nobiletin was compared with that of Heparin.

EXPERIMENT A

Animals:

80 rats approximately 250g in weight were used in the experiment.

Compound tested:

A solution consisting of equal parts of 1,2-propanediol and physiological saline,8.5g/L (PGS) was used as a solvent for the compounds. The following quantities of each compound were prepared per ml of PGS. (a) 67 units Heparin, (b) 1.06 mg Nobiletin, (c) 67 units Heparin + 1.06mg Nobiletin. (d) 33.5 units Heparin + 0.53mg Nobiletin and (e) ADP, 40 mg per ml in physiological saline tris buffer.

The dosage of Nobiletin was based on previous in vitro work [ 6) Robbins et al. above]. The quantity used showed several fold greater activity in vitro against blood cell aggregation than did low molecular weight Dextran. The dosage of Heparin used was based on prior observations by others in that high levels of Heparin were necessary to reduce blood sludging in monkeys with malaria. The dosage used increased clotting time to 10+ minutes as determined with a Mechrolab clot timer (the blood dried in the instrument but did not coagulate).

Procedure:

Four rats of equal weight were selected at each trial and solutions 1, 2, 3 or 4 injected per kg body weight as follows: 1) 143 units Heparin, 2) 2.12mg Nobiletin, 3) 143 units Heparin + 2.12mg Nobiletin, 4) 71 units Heparin + 1.06mg Nobiletin. The above quantities of each solution were administered by heat puncture using a tuberculine syringe with a 1.5 inch, 25 gauge needle. After a lapse of 30 to 40 minutes each animal was given 80mg ADP per kg body weight via a second heart puncture. The death or recovery rate of the animal was recorded. If the rat died, the thoracic cavity was opened and inspected for hemorrhage to determine whether the heart puncture was the apparent cause of death. The survival data were analyzed statistically using chi-square.

Results:

Protective effects provided by Heparin or Nobiletin against death of rats due to intravascular infusion of ADP are shown in Table 1. Also shown are the protective effects provided by Heparin and Nobiletin combined.

Table 1

Effect of Heparin and Nobiletin on Reduction of Deaths in Rats Infused with ADP[1]

| Heparin 143 units/kg | Nobiletin 2.1 mg/kg | Heparin + Nobiletin 143 units + 2.1 mg/kg | Heparin + Nobiletin 71 units + 1.0 mg/kg |
|---|---|---|---|
| 0 | + | + | +++ |
| 0 | ++ | + | ++ |
| 0 | ++ | + | +++ |
| + | ++ | +++ | ++ |
| 0 | 0 | + | ++ |
| 0 | ++ | +++ | 0 |
| + | + | ++ | + |

Table 1—Continued

Effect of Heparin and Nobiletin on Reduction of Deaths in Rats Infused with ADP[1]

| Heparin<br>143 units/kg | Nobiletin<br>2.1 mg/kg | Heparin + Nobiletin<br>143 units + 2.1 mg/kg | Heparin + Nobiletin<br>71 units + 1.0 mg/kg |
|---|---|---|---|
| 0 | ++ | 0 | 0 |
| + | ++++ | +++ | +++ |
| ++ | ++ | +++ | 0 |
| 0 | + | +++ | ++ |
| 0 | ++ | + | +++ |
| 0 | ++ | 0 | 0 |
| 0 | +++ | + | + |
| + | + | + | + |
| 0 | 0 | 0 | ++ |
| 0 | +++ | 0 | 0 |
| 0 | +++ | 0 | + |
| 0 | 0 | 0 | ++ |
| + | + | ++ | 0 |
| % survival 30 | 85 | 75 | 65 |

[1] Infused with 80mg ADP per kg body wt.
0 — died
+ — lived, appeared normal in 3 hr.
++ — lived, do. 2 to 3 hrs.
+++ — lived, do. 5 to 15 min.
++++ — lived, do. 1 to 5 min.

The rats that failed to survive died immediately after infusion of ADP. Hemorrhage from heart puncture was not the apparent cause of death. Some rats that lived recovered slowly over a period of 3 + hours; others appeared normal in 1 to 2 hours; others in 15 to 30 minutes and a few appeared normal in 1 to 5 minutes after intravascular infusion of ADP.

Analysis of the data using chi-square revealed a highly significant difference ($P<0.01$) in survival rates between Heparin and Nobiletin treated rats. There were no significant differences in survival rates between Nobiletin or Nobiletin plus Heparin treated rats, as seen above.

Discussion:

Heparin offered little protection against intravascular infusion of ADP as evidenced by death of 70% of the animals. In contrast only 15 percent of the Nobiletin protected animals died as a result of infusion of ADP. The survival rate was highly significantly different $P<0.01$ with Nobiletin. When Heparin and Nobiletin were both administered to the same rat there was also a highly significant increase $P<0.01$ in survival over that of Heparin alone. The 85 percent survival rate with Nobiletin at 2.1 mg/kg and 80 mg/kg ADP compares favorably with the 75 percent survival rate using 200 mg/kg of 2 methyl 4 tert-butyl δ ketolactone and 170 mg ADP/kg previously reported. The dosage of ADP required to produce death may vary with a number of parameters one being site of injection. The others injected the ADP into the caudal caval vein while in the present experiment the ADP was injected directly into the heart.

As reported by several investigators ADP causes platelet and red cell thrombi, lung embolization and death and fibrin formation may be minimal under these conditions. This is probably the reason that Heparin has little anti-adhesive effect since it prevents blood clotting by formation of a chemical complex in plasma which inactivates thrombin and ac-globulin (factor V). However, Heparin not only inhibits coagulation but also affects cell membranes and that Heparin reduced the adhesiveness of erythrocytes in monkeys with malaria, while Heparin is reported to be generally ineffective against red cell aggregation. Heparin also affects platelet membranes and Heparin induces a thrombocytopenia associated with platelet clumping in man and animals.

The protective effect of Nobiletin against intravascular infusion of ADP in this experiment appears to be due to its anti-adhesive action since Nobiletin shows little or no effect on blood coagulation. Nobiletin probably has membrane effects on platelets and red cells similar to that of other anti-adhesive compounds which inhibit thrombosis but do not affect fibrin formation. While vessle may vessels occluded by platelet or red cell thrombi, fibrin formation is an important part of most thrombi formed under pathological conditions.

While anti-adhesive compounds are important in anti-thrombogenic treatments, it should be noted that the pathogenesis of thrombosis are multiple in nature. Some researchers have determined that stasis and hypercoagulability are prominent features in venous thrombosis and vascular lesions in arterial thrombosis. Thrombosis may occur by the interaction of mechanisms of platelet aggregation, blood coagulation, accumulation of white blood cells, clumping and hemolysis of red blood cells. While the current emphasis by some researchers is on platelets, it is too simple to shift the entire responsibility of thrombosis upon platelets alone. Further platelets are only partially responsible for thrombotic manifestations and it is not sufficiently demonstrated to justify a treatment (such as anti-adhesive drugs) which would be directed exclusively against red cells or platelets. For example, under conditions of this experiment, Nobiletin was effective against thrombosis due to ADP infusion and it appears that this experiment deals primarily with platelets and red cell thrombi. In situations where fibrin formation is important, Nobiletin would not be expected to be effective since it has no appreciable effect on clotting time of blood. Thus, because of the varying quantitative aspects of thrombi formation under many different pathological situations, combination of an anti-adhesive and an anticoagulant would appear to offer more protection than either drug alone.

Methoxylated flavonoids, having at least two methoxyl substituents, were further demonstrated to be important in medicine where Sinensetin was added to human blood with clumped cells and aggregation was reduced. Blood was taken from patients with diabetes, leukemia, tuberculosis and pneumonia and 0.011 mg of Sinensetin per ml of blood was added, and this resulted in a decrease of aggregation as evidenced by an average decrease of 31.5% in the sedimentation rate, as hereinafter more fully described.

There have been reports that blood cell aggregation caused infarction of vital organs and in experimental animals, if blood cell aggregation was severe and of long duration, several adverse effects occurred, i.e., anemia, thrombocytopenia, reticulocytosis, prolongation of blood clotting time, enlargement and microscopic damage of parenchymatous organs. Severe blood cell aggregation accompanies many pathological conditions and often is present for long periods in chronic diseases and infections. Under such conditions patients with severe blood cell aggregation of long duration exhibit organ damage and the serious consequences indicates adjunct theraphy against aggregation would be highly beneficial in the many diseases and injuries where it occurs.

The methoxylated flavonoids having two or more methoxyl substituents have strong blood cell anti-adhesive effects both in vivo and in vitro and they are effective at low blood concentrations. The present experiment was conducted to determine whether such methoxylated flavonoids would disaggregation the blood cell clumps accompanying a variety of human diseases.

EXPERIMENT B

Blood

Ten ml of blood was drawn from hospitalized adult human patients with diseases known to be accompanied by blood cell aggregation or an increased erythrocyte sedimentation rate.

Compound tested

Sinensetin (5,6,7,3',4'-pentamethoxyflavonone, M.W. 372.34) which shows strong anti-adhesive effects on blood cells was used in the experiments. The composition was tested at a blood concentration of $3 + 10^{-5}$ molar (11.17 micrograms per ml). For addition to blood the Sinensetin was dissolved in equal parts of 1,2-propanediol and saline solution (8.7 g/liter) (PGS). The $3 + 10^{-5}$ molar concentration involved dissolving 24.57 mg of Sinensetin in 50 ml of PGS and adding 0.11 ml to 5 ml of blood. An equal volume of PGS was used for the control blood.

Procedure

The 10 ml of blood was drawn from each patient using a syringe and the blood was immediately transferred to 5 ml vacuum tubes containing EDTA. The blood containing the PGS or PGS + sinensetin were placed in a 98.6° water bath mounted on a shaker, set at 88 excursions per minute. The erythrocyte sedimentation rates (ESR) were determined using a serial procedure [(4) Robbins et al. above]. The procedure involves maintaining blood in vitro in thermal and flow equilibrium and determining the ESR at intervals using the Wintrobe sedimentation tube. Each determination was read 1 hour after it was started.

Smear slides were made at hourly intervals to confirm the changes in aggregation as indicated by the ESR.

Results

Sinensetin at a blood concentration of 11.17 microgram per ml of blood was Sinensetin against blood cell clumping accompanying the four diseases below and the results are shown in Table 1.

TABLE 1

|  |  | Hematocrit Vol. % | ESR mm/hr. 1 hr. | 2 hr. | 3 hr. | 4 hr. | % Decrease |
|---|---|---|---|---|---|---|---|
| 1. Diabetes | C | 45.2 | 19 | 22 | 29 | 18 |  |
|  | T | 45.2 | 17 | 18 | 26 | 16 | 12.4 |
| 2. Lymphocytic Lukemia | C | 24.3 | 48 | 47 | 44 | 42 |  |
|  | T | 24.3 | 41 | 36 | 31 | 27 | 25.4 |
| 3. Tubercular Meningitis | C | 46.3 | 7 | 8 | 6 | 6.2 |  |
|  | T | 46.7 | 1.5 | 2 | 2 | 1.5 | 74.3 |
| 4. Pneumonia | C | 56.0 | 7 | 8 | 3.5 | 4.5 |  |
|  | T | 55.8 | 6 | 7 | 3 | 4 | 14.0 |
| Average |  | 42.98 |  |  |  | Average | 31.5 |

C = Control
T = Test

7 Sinensetin shows a reduction in the ESR in every instance. The percent decrease due to Sinensetine ranged from 12.4 percent diabetes to 74.3 percent in tuberculosis.

Discussion

The data shows the Sinensetin had blood cell disaggregating activity in blood taken from human patients with diabetes, lukemia, tuberculosis and pneumonia. These patients were under treatment for their specific diseases and the sedimentation rate was approaching normal for the patients with tuberculosis and pneumonia. However, the sedimentation rates were still high, even after correction for Hematocrits for the patients with diabetes and lukemia. It is well known that blood cell aggregation may be present for long periods in clinical conditions such as chronic infectious and metabolic diseases such as diabetes. The blood cell aggregation causes infaraction in vital organs.

It appears that in addition to the usual treatments in many diseases and injuries, adjunct therapy with anti-adhesive compositions in accord with this invention may be indicated to prevent the adverse effects caused by clumped blood. Further it should be noted that in the low sedimentation rates in blood from patients with tuberculosis and pneumonis that Sinensetin brought about respective 74 and 14 percent reductions in the sedimentation rates.

The methoxylated flavonoids having two or more methoxyl substituents are effective as blood cell anti-adhesive agents. The effectiveness of Sinensetin at 0.011 mg per ml of blood compares more than favorably with the 2.8 mg per ml of 2-4 Methyl Butyl Ketolactone and the 12 – 15 of low molecular weight Dextran used clinically to combat aggregation. On a molar basis the methoxylated flavonoids are many fold more active than low molecular weight Dextran are generally of low toxicity which is fortunate since they are widely distributed in the food supply. For example the methoxylated flavonoids Sinensetin, Nobiletin and Heptamethoxyflavone are found in orange juice at a combined concentration of 4 to 7 ppm. Also, the methoxylated flavonoids may be orally administered since the common flavonoids such as Hesperedin and Rutin appear to be readily absorbed from the gastrointestinal tract.

Also, tests were performed to determine whether the flavonoids having at least two methoxyl substituents effected the clotting-time of blood. The results of these tests were that such flavonoids did not have a statistically significant effect, either in vitro or in vivo of the clotting-time of blood.

The use of blood cell anti-adhesive compositions in accord with this invention are for conditions of impending thrombosis and embolism of large blood vessels and in a wide variety of diseases and injuries that are accompanied by aggregated blood cells which impair the microcirculation. Such flavonoid compositions reduce the blood cell clumping accompanying human diseases whereever the clumping is severe and of long duration it causes enlargement and damage to vital organs. Since blood cell clumping promotes thrombosis, such flavonoids protect against thrombosis and embolism of blood vessels. Also methoxylated flavonoids are compatible with blood anti-coagulants and combined with such compounds inhibit two aspects of thrombosis, namely the aggregation of blood cell clumping and the formation of fibrin, thus preventing a broader range of thrombosis action than either type compound without the other.

Most of the flavonoids having at least two methoxyl substituents are contained in citrus oranges, but there are no apparent reasons which would prevent other citrus and non-citrus flavonoids from being effective to disaggregate blood cells, for example:

O. 5,7,4'-tri OH-6,8-di-O-Methoxyflavone (Demethoxysudachitin) and/or 3' demethyl sudachitin
P. 5,7,4'-tri OH-6,8,3'-tri-O-Me (Sudachitin) or 6,7,3'-trimethoxy -5,8,4'-trihydroxyflavone
Q. 3,6,7,8,4'-pentamethoxyflavone (Auranetin)
R. 5,6,7,8,3',4'-hexamethoxyflavone (Citromitin)
S. 8,3'-dimethoxy -3,5,7,4'-tetrahydroxyflavone (Limocitrin)
T. 5,6,7,2'-tetramethoxyflavone (Zapotin)
U. 5-hydroxy -6,7,2'-trimethoxyflavone (Zapotinin)
V. 5,2',5' - trihydroxy -3,7,4'-trimethoxyflavone (Oxyayanin -A)
W. 5,6,2' -tri-O-methoxyflavone
X. 5,3'-di OH - 7,8,2' tri-O-methoxyflavone (Wightin)
Y. 5,7 -di OH-6,4' - di-O-methoxyflavone (Pectolinaringenin)
Z. 5-OH-6,7,4'-tri-O-methoxyflavone (Mikanin)
AA. 5,6,7,8-tetra-O-methoxyflavone
BB. 5,4'-di OH-6,7 8 - tri-O-methoxyflavone (Xanthomicrol)
CC. 5,7-di OH-6,8-di-O-Me, 3',4' $O_2$ $CH_2$ flavone (Lucidin)
DD. 5,6,7,8 - tetra-O-Me-3'4'-$O_2$ $CH_2$ flavone
EE. 7,8,3',4' -tetramethoxy flavan-3,4-diol
FF. 3,5,7,4' - tetrahydroxy - 3',5,5' - dimethoxy flavylium (Malvidin)
GG. 3-hydroxy - 4,5 - dimethoxy isoflavone (Irigenin)

While the invention has been described with respect to certain specific and preferred embodiments, it will be appreciated that many modifications and changes and substitutions of equivalent materials may be made by those skilled in the art without department from the spirit of the invention. It is intended, therefore, by the appended claims to cover all such modifications and changes as fall within the true spirit and scope of the invention.

What is claimed as new and what it is desired to secure by Letters Patent of the United States:

1. A method of disaggregating blood cells consisting essentially of introducing by intra-vascular infusion into the bloodstream a flavonoid having at least two methoxyl substituents, wherein said flavonoid is 3', 4', 5, 6, 7 - pentamethoxyflavone (Sinensetin), 3', 4', 5, 6, 7,8-hexamethoxyflavone (Nobiletin), 3,3',4',5,6,7, 8-heptamethoxyflavone (Heptamethoxyflavone), 4', 5, 6, 7 -tetramethoxyflavone (Tetra-O-methylscutellarein), or 4', 5, 7 -trimethoxyflavone (Tri - O - methylapigenin).

2. The method as defined in claim 1 wherein said flavonoid is 3', 4', 5, 6, 7 - pentamethoxyflavone (Sinensetin).

3. The method as defined in claim 1 wherein said flavonoid is 3', 4', 5, 6, 7, 8 - hexamethoxyflavone (Nobiletin).

4. The method as defined in claim 1 wherein said flavonoid is 3, 3', 4', 5, 6, 7, 8 - heptamethoxyflavone (Heptamethoxyflavone).

5. The method as defined in claim 1 wherein said flavonoid is 4', 5, 6, 7 - tetramethoxyflavone (Tetra- O - methylscutellarein.

6. The method as defined in claim 1 wherein said flavonoid is 4', 5, 7 - trimethoxyflavone (Tri - O - methylapigenin).

* * * * *